United States Patent
R et al.

(10) Patent No.: US 11,507,271 B1
(45) Date of Patent: Nov. 22, 2022

(54) SYSTEM AND METHOD OF WEAR LEVELING INFORMATION HANDLING SYSTEMS OF A STORAGE CLUSTER

(71) Applicant: Dell Products L.P., Round Rock, TX (US)

(72) Inventors: Chandrasekhar R, Darbhanga (IN); Ravishankar N. Kanakapura, Bangalore (IN); Abhishek Gupta, Delhi (IN); Anand Changegowda, Bangalore (IN); Rishi Chandra, Darbhanga (IN); Kevin Marks, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/443,587

(22) Filed: Jul. 27, 2021

(51) Int. Cl.
*G06F 3/00* (2006.01)
*G06F 3/06* (2006.01)
*G06F 11/30* (2006.01)
*G06F 11/34* (2006.01)

(52) U.S. Cl.
CPC .......... *G06F 3/0604* (2013.01); *G06F 3/0629* (2013.01); *G06F 3/0683* (2013.01); *G06F 11/3034* (2013.01); *G06F 11/3433* (2013.01)

(58) Field of Classification Search
None
See application file for complete search history.

(56) References Cited

PUBLICATIONS

Pinheiro, Eduardo, Wolf-Dietrich Weber, and Luiz André Barroso. "Failure trends in a large disk drive population." (2007).
Get S.M.A.R.T. for Reliability—Technology Paper. Seagate Technology, No. TP-670, Jul. 1999.
Fly Height Monitor Improves Hard Drive Reliability—Western Digital, 1999.
Seagate SMART Attribute Specification—Seagate Technology, Mar. 10, 2011.
Evans, Mark. Hard Drive Self-tests. T10/99-179 rev 0, Apr. 26, 1999.
Mht2080at, MHT2060AT, MHT2040AT, MHT2030AT, MHT2020AT—Disk Drives Product Manual, C141-E192-02EN, Fujitsu, 2003.

*Primary Examiner* — Midys Rojas
(74) *Attorney, Agent, or Firm* — McDermott Will & Emery LLP

(57) ABSTRACT

In one or more embodiments, one or more systems, one or more methods, and/or one or more processes may: receive performance information for a base workload; determine multiple threshold values of multiple storage media layers of each IHS of a storage cluster based at least on the performance information for the base workload and multiple inventory information respectively associated with multiple storage media layers of each IHS of the storage cluster; receive multiple condition values respectively associated with the multiple storage media layers of an IHS of the storage cluster; determine that a condition value of the multiple condition values associated with a storage media layer of the multiple storage media layers is at or below a threshold value of the multiple threshold values associated with the storage media layer of the multiple storage media layers; and reduce a storage workload of a specific IHS of the storage cluster.

20 Claims, 6 Drawing Sheets

SYSTEM AND METHOD OF WEAR LEVELING INFORMATION HANDLING SYSTEMS OF A STORAGE CLUSTER

BACKGROUND

Field of the Disclosure

This disclosure relates generally to information handling systems and more particularly to wear leveling information handling systems of a storage cluster.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, for each information handling system of a storage cluster of multiple information handling systems, a request for multiple inventory information respectively associated with multiple storage media layers of the information handling system to the information handling system may be provided by a management console associated with the cluster. In one or more embodiments, for each information handling system of the storage cluster: a baseboard management controller of the information handling system may determine multiple inventory information respectively associated with multiple storage media layers of the information handling system and may provide the multiple inventory information to the management console.

In one or more embodiments, the management console may: receive performance information for a base workload from an information handling system associated with a vendor information handling system associated with at least one storage media component of the storage cluster; determine multiple threshold values of the multiple storage media layers of each information handling system of the cluster based at least on the performance information for the base workload and the multiple inventory information respectively associated with the multiple storage media layers of each information handling system of the storage cluster; receive multiple condition values respectively associated with the multiple storage media layers of a specific information handling system of the storage cluster; and determine that a condition value of the multiple condition values associated with a storage media layer of the multiple storage media layers is at or below a threshold value of the multiple threshold values associated with the storage media layer of the multiple storage media layers. In one or more embodiments, one or more systems, one or more methods, and/or one or more processes may reduce a storage workload of the specific information handling system of the storage cluster. For example, reducing a storage workload of the information handling system of the storage cluster may be performed in response to determining that the condition value associated with the storage media is at or below the threshold value associated with the storage media layer.

In one or more embodiments, reducing the storage workload of the specific information handling system of the storage cluster may include reducing a storage I/O data rate associated with the specific information handling system of the storage cluster. For example, after reducing the storage workload of the specific information handling system of the storage cluster, storage workloads of all other information handling systems of the storage cluster may be reduced. For example, after reducing storage workloads of all other information handling systems of the storage cluster, the storage workload of the specific information handling system of the storage cluster may be increased. In one or more embodiments, reducing the storage workload of the specific information handling system of the storage cluster may include reducing the storage workload of the specific information handling system of the storage cluster from a first storage I/O data rate to a second storage I/O data rate. For example, increasing the storage workload of the specific information handling system of the storage cluster may include increasing the storage workload of the specific information handling system of the storage cluster to the first storage I/O data rate.

In one or more embodiments, a first storage media layer of the multiple storage media layers may be associated with a first I/O data rate, a second storage media layer of the multiple storage media layers may be associated with a second I/O data rate, and a third storage media layer of the multiple storage media layers may be associated with a third I/O data rate. For example, the first I/O data rate may be greater than or equal to the second I/O data rate, and the second I/O data rate may be greater than or equal to the third I/O data rate. For instance, the first storage media may include volatile memory media, and the second storage media include non-volatile memory media. In one or more embodiments, the volatile memory media may include random access memory, and the non-volatile memory media may include at least one solid state drive. For example, the third storage media may include at least one magnetic media hard drive. In one or more embodiments, the information handling systems of the storage cluster may be coupled to a network.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
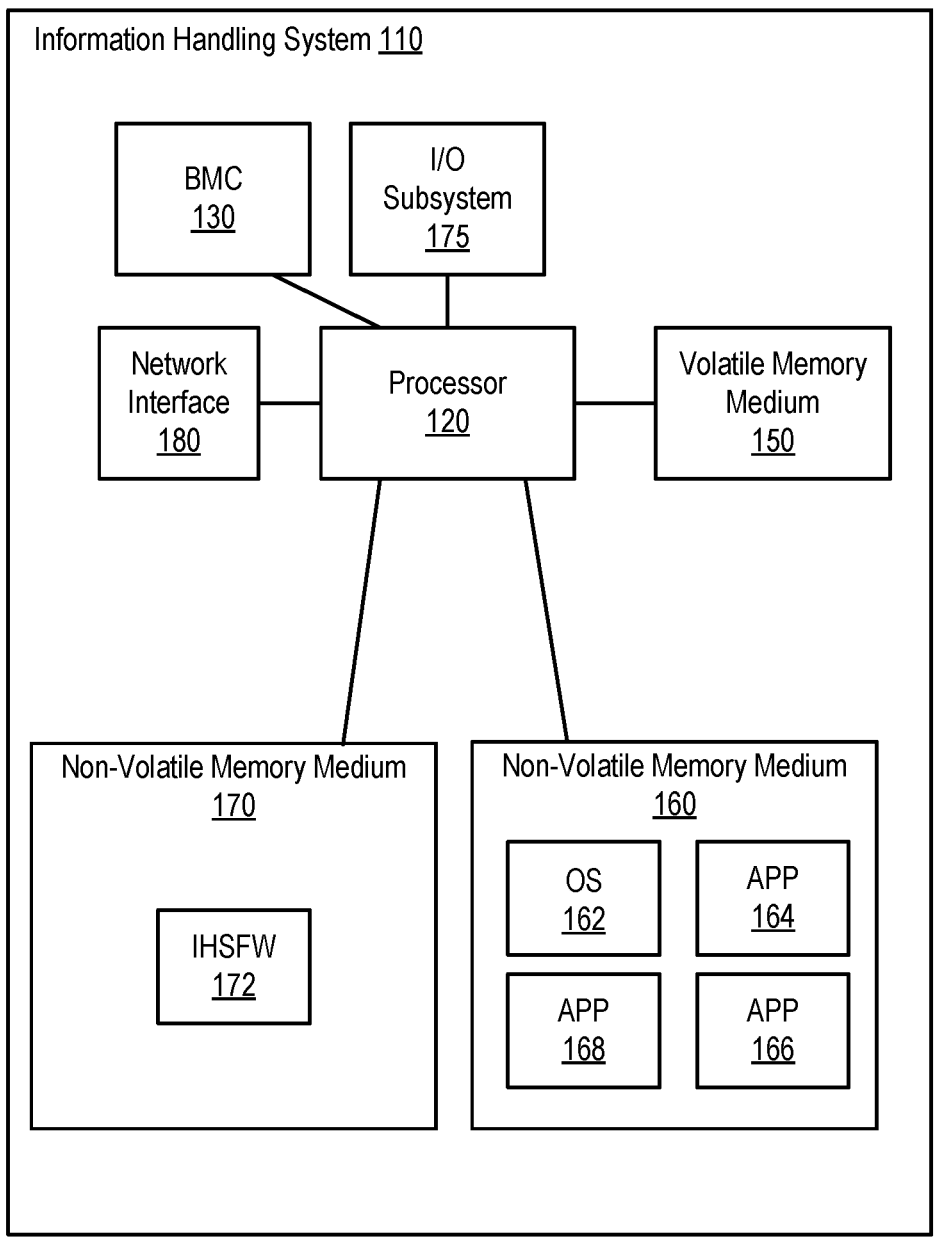
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a software defined storage (SDS) cluster may include multiple storage media layers. For example, a SDS cluster may include three storage media layers, which may include a random access memory (RAM) layer, a solid state drive (SSD) layer, and a hard disk drive (HDD)/SSD layer. In one instance, a HDD may include one or more spinning hard magnetic disks that store data. In another instance, a SSD may include solid state non-volatile memory media that may store data. As an example, a SSD may include NAND flash that may store data. In one or more embodiments, efficiency and performance of a SDS cluster may be based at least on wearing/health of the multiple storage media layers of the SDS cluster. For example, individual memory media of the SDS cluster may wear out over time. For instance, over time, health of components the multiple storage media layers of the SDS cluster may degrade, which may reduce an efficiency of an information handling system in processing one or more workloads. In one or more embodiments, wear may occur at different rates with different components of the SDS cluster. For example, one or more storage components attached to a node (e.g., an information handling system of a SDS cluster) may degrade at a rate based at least on one or more workload distribution patterns. For instance, based at least on the one or more workload distribution patterns, a first component attached to a node may degrade at a rate faster than a second component attached to the node.

In one or more embodiments, a system management console may inventory a SDS cluster to obtain configuration information associated with multiple storage media layers of the SDS cluster. For example, the system management console may inventory a RAM layer, a SSD layer, and a HDD/SSD layer of the SDS cluster to obtain configuration information associated with those storage media layers. In one or more embodiments, vendor specified platform metrics for standard workloads (e.g., typical workloads, common workloads, conventional workloads, etc.) may be obtained from a vendor. For example, the vendor specified platform metrics for the standard workloads may be obtained from a support website associated with the vendor.

In one or more embodiments, a baseboard management controller (BMC) may provide inventory information associated with an information handling system (e.g., a node of a SDS cluster). For example, the inventory information associated with the information handling system provided by the BMC may include a number of processors, an amount of volatile memory available (e.g., an amount of RAM available), a type of the volatile memory available (e.g., a type of RAM available, a speed of RAM available, etc.), and peripheral information (e.g., networking capability information, information associated with additional accelerators, etc.). For instance, a peripheral of the information handling system may include a component of the information handling system that is communicatively coupled to a processor of the information handling system via a peripheral component interconnect express (PCIe) communication coupling.

In one or more embodiments, the system management console may construct a performance profile utilizing the vendor specified platform metrics and the inventory information from the BMC. For example, the performance profile may include processor availability, volatile memory information, I/O throughput, network bandwidth load, load on the SSD layer, load on the HDD/SDD layer, and power consumption, among others. In one or more embodiments, a golden reference may be created based at least on the performance profile constructed by the system management console. For example, a user (e.g., an administrator) may create the golden reference based at least on the performance profile constructed by the system management console. For instance, the golden reference may be associated with an ideal performance that can be met by a SDS cluster.

In one or more embodiments, the system management console may provide an option to configure a deviation level with respect to the golden reference (e.g., a deviation of 10%, 20%, 30%, etc. from the golden reference or a custom deviation from the golden reference). In one or more embodiments, threshold levels of wear indicators of any component in a SSD cluster node (e.g., an information handling system) may be configured. For example, the user (e.g., the administrator) may configure the threshold levels. For instance, the threshold levels may range from zero to "n", where zero may mean little to no wear and "n" may mean a complete wear out or a maximum wear out (e.g., a percentage of non-correctable errors). As an example, the threshold levels may range from zero (0) to one hundred (100).

In one or more embodiments, the system management console may monitor metrics data, which may result in a deviation in system resource consumption from the golden reference. For example, the deviation may be correlated with historical time series data based at least on health metrics of the multiple layers a SDS cluster node (e.g., an information handling system). In one or more embodiments, if there is a deviation of performance from a permitted configured deviation, a notification alert (e.g., a SMART alert) may be sent to a SDS cluster manager. For example, the SDS cluster manager may de-prioritize the SDS cluster node based at least on the deviation of performance from the permitted configured deviation. For instance, deprioritizing the SDS cluster node may include reducing one or more workloads deployed to the SDS cluster node. As an example, deprioritizing one or more SDS cluster nodes may implement wear leveling of components of the SDS cluster nodes. In one or more embodiments, when all SDS cluster nodes reach the configured deviation, the deviation level may be modified. For example, if the deviation level was 10%, the deviation level may be modified to 20%. For instance, the deviation level may be modified to continue to wear level the SDS cluster nodes.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a BMC 130, a volatile memory medium 150, non-volatile memory media 160 and 170, an I/O subsystem 175, and a network interface 180. As illustrated, BMC 130, volatile memory medium 150, non-volatile memory media 160 and 170, I/O subsystem 175, and network interface 180 may be communicatively coupled to processor 120.

In one or more embodiments, one or more of BMC 130, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of BMC 130, volatile memory medium 150, non-volatile memory media 160 and 170, I/O subsystem 175, and network interface 180 may be communicatively coupled to processor 120 via one or more PCI-Express (PCIe) root complexes. In another example, one or more of BMC 130, I/O subsystem 175, and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a RAM, a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

In one or more embodiments, BMC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 130 may be or include an application processor. In one example, BMC 130 may be or include an ARM Cortex-A processor. In another example, BMC 130 may be or include an Intel Atom processor. In one or more embodiments, BMC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

Figure 2:
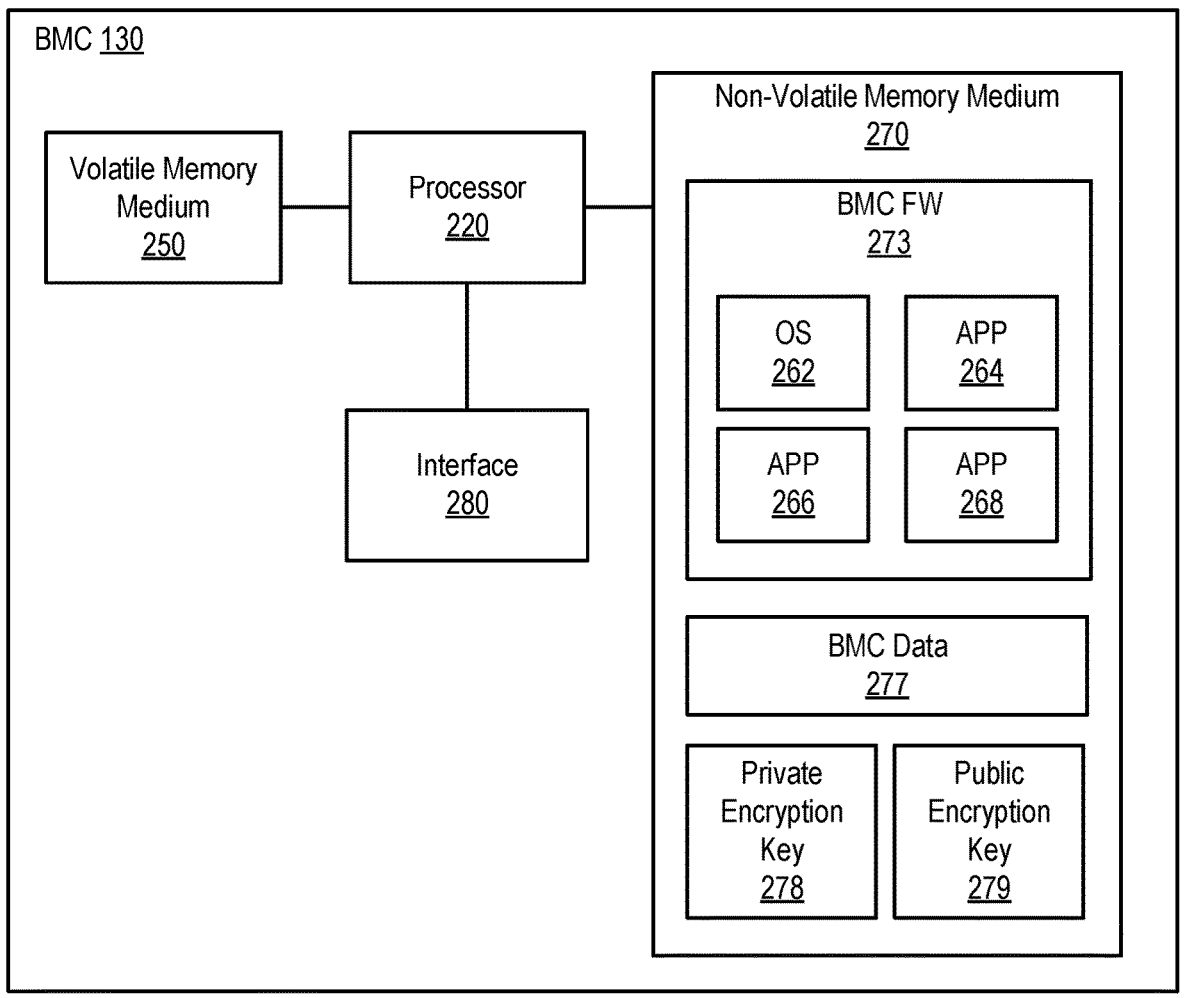
FIG. 2 illustrates an example of a baseboard management controller, according to one or more embodiments.

Turning now to FIG. 2, an example of a baseboard management controller is illustrated, according to one or more embodiments. As shown, BMC 130 may include a processor 220, a volatile memory medium 250, a non-volatile memory medium 270, and an interface 280. As illustrated, non-volatile memory medium 270 may include a BMC firmware (FW) 273, which may include an OS 262 and APPs 264-268, and may include BMC data 277. In one example, OS 262 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In a second example, OS 262 may be or include an Unix-like operating system. For instance, the Unix-like operating system may be or include LINUX®, FREEBSD®, NETBSD®, OpenBSD, Minix, Xinu, or Darwin, among others. In another example, OS 262 may be or include a portable operating system interface (POSIX) compliant operating system. As illustrated, non-volatile memory medium 270 may include a private encryption key 278. As shown, non-volatile memory medium 270 may include a public encryption key 279. In one or more embodiments, private encryption key 278 may be different from public encryption key 279. For example, private encryption key 278 and public encryption key 279 may be asymmetric encryption keys. In one instance, data encrypted via private encryption key 278 may be decrypted via public encryption key 279. In another instance, data encrypted via public encryption key 279 may be decrypted via private encryption key 278.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable BMC 130 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, at least a portion of one or more flowcharts, one or more methods, and/or at least a portion of one or more processes described herein. For example, non-volatile memory medium 270 and/or volatile memory medium 250 may store instructions that may be executable in accordance with at least a portion of one or more systems, at least a portion of one or more flowcharts, at least a portion of one or more methods, and/or at least a portion of one or more processes described herein. In one or more embodiments, processor 220 may execute instructions in accordance with at least a portion of one or more of systems, flowcharts, at least a portion of one or more methods, and/or at least a portion of one or more processes described herein. For example, non-volatile memory medium 270 and/or volatile memory medium 250 may store instructions that may be executable in accordance with at least a portion of one or more of systems, at least a portion of one or more flowcharts, at least a portion of one or more methods, and/or at least a portion of one or more processes described herein. In one or more embodiments, processor 220 may utilize BMC data 277. In one example, processor 220 may utilize BMC data 277 via non-volatile memory medium 270. In another example, one or more portions of BMC data 277 may be transferred to volatile memory medium 250, and processor 220 may utilize BMC data 277 via volatile memory medium 250.

Figure 3A:
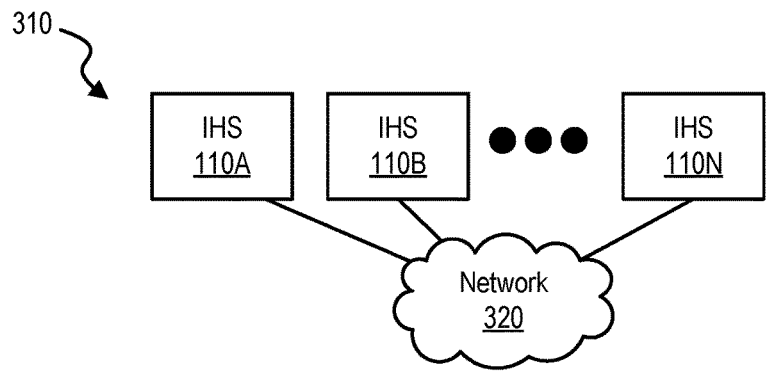
FIG. 3A illustrates an example of a storage cluster, according to one or more embodiments.

Turning now to FIG. 3A, an example of a storage cluster is illustrated, according to one or more embodiments. In one or more embodiments, a storage cluster may be or may include a SDS cluster. For example, a storage cluster 310 may be or may include a SDS cluster. In one or more embodiments, a storage cluster may include multiple information handling systems. For example, storage cluster 310 may include multiple information handling systems (IHSs) 110A-110N. Although storage cluster 310 is illustrated as including IHSs 110A-110N, storage cluster 310 may include any number of IHSs 110, according to one or more embodiments. In one or more embodiments, the information handling systems of the storage cluster may be coupled to a network. For example, IHSs 110A-110N may be coupled to a network 320. For instance, storage cluster 310 may include network 320. In one or more embodiments, a BMC 130 of an IHS 110 may be communicatively coupled to network 320.

In one or more embodiments, network 320 may include a wired network, a wireless network, an optical network, or a combination of the foregoing, among others. For example, network 320 may include and/or be coupled to various types of communications networks. For instance, network 320 may include and/or be coupled to a LAN, a WAN (e.g., a private WAN, a corporate WAN, a public WAN, etc.), an Internet, a public switched telephone network (PSTN), a cellular telephone network, a satellite telephone network, or a combination of the foregoing, among others.

Figure 3B:
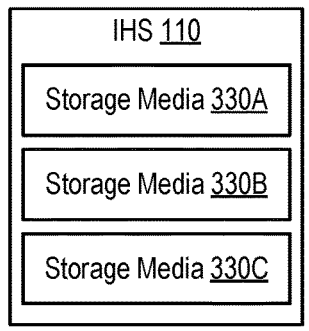
FIG. 3B illustrates a second example of an information handling system, according to one or more embodiments.

Turning now to FIG. 3B, a second example of an information handling system is illustrated, according to one or more embodiments. In one or more embodiments, IHS 110 may include storage media 330A-330C. In one example, storage media 330A may include volatile storage. For instance, storage media 330A may include RAM. As an example, storage media 330A may include one or more dual in-line memory modules (DIMMs). In a second example, storage media 330B may include non-volatile storage. For instance, storage media 330B may include solid state non-volatile storage. As an example, storage media 330B may include one or more solid state drives (SSDs). In another example, storage media 330C may include non-volatile storage. For instance, storage media 330B may include solid state non-volatile storage and/or magnetic non-volatile storage. As an example, storage media 330B may include one or more hard disk drives (HDDs) and/or one or more SSDs.

In one or more embodiments, storage media 330A-330C may be respectively associated with multiple storage media layers. For example, storage media 330A may be associated with a first storage media layer, storage media 330B may be associated with a second storage media layer, and storage media 330C may be associated with a third storage media layer. In one or more embodiments, storage media 330A may be associated with a first I/O data rate, storage media 330B may be associated with a second I/O data rate, and storage media 330C may be associated with a third I/O data rate. For example, the first I/O data rate may be greater than or equal to the second I/O data rate, and the second I/O data rate may be greater than or equal to the third I/O data rate.

Figure 3C:
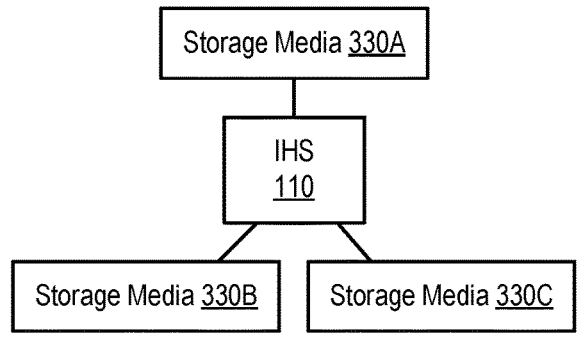
FIG. 3C illustrates a third example of an information handling system, according to one or more embodiments.

Turning now to FIG. 3C, a third example of an information handling system is illustrated, according to one or more embodiments. In one or more embodiments, IHS 110 may be communicatively coupled to storage media 330A-330C. For example, storage media 330A-330C may be external to IHS 110. In one or more embodiments, IHS 110 may include one or more of storage media 330A-330C and/or may be communicatively coupled to one or more of storage media 330A-330C that may be external to IHS 110. Although not specifically illustrated, IHS 110 may include a first portion of storage media 330 and may be communicatively coupled to a second portion of storage media 330 that may be external to IHS 110, according to one or more embodiments. As an example, IHS 110 may include storage media 330A and may be communicatively coupled to storage media 330B and 330C.

Figure 3D:
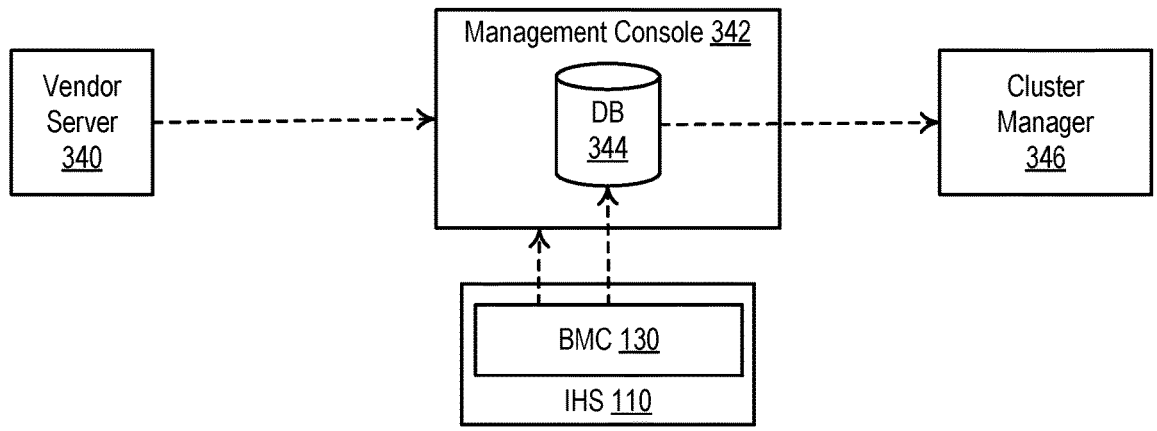
FIG. 3D illustrates an example of a process of operating a storage cluster, according to one or more embodiments.

Turning now to FIG. 3D, an example of a process of operating a storage cluster is illustrated, according to one or more embodiments. In one or more embodiments, a management console 342 may obtain inventory data from a BMC 130 of an IHS 110. For example, management console 342 may be a management console of storage cluster 310. For instance, management console 342 may obtain inventory data from each of baseboard management controllers (BMCs) 130 of IHS 110A-110N of storage cluster 310.

In one or more embodiments, management console 342 may obtain vendor specified information handling system metrics from a vendor server 340 associated with a vendor. For example, vendor server 340 may include a web server. For instance, management console 342 may obtain vendor specified information handling system metrics from the web server of vendor server 340. In one or more embodiments, management console 342 may construct a performance profile based at least on the inventory data from each of BMCs 130 of IHS 110A-110N of storage cluster 310 and the vendor specified information handling system metrics.

In one or more embodiments, management console 342 may create a golden reference. For example, management console 342 may store the golden reference. For instance, management console 342 may store the golden reference via a database (DB) 344. In one or more embodiments, management console 342 may include DB 344. Although management console 342 is illustrated as including DB 344, DB 344 may be external to management console 342, and DB 344 may be communicatively coupled to management console 342, according to one or more embodiments. In one or more embodiments, a performance deviation level and a health indicator level may be configured. For example, a user (e.g., an administrator of storage cluster 310) may the configure performance deviation level and the health indicator level. For instance, the configure performance deviation level and the health indicator level may be stored via DB 344.

In one or more embodiments, management console 342 may obtain metrics and deviation of resource consumption. For example, management console 346 may obtain metrics and deviation of resource consumption from DB 344. In one or more embodiments, management console 342 may provide deviation alert information to a cluster manager 346. In one or more embodiments, when IHSs 110A-110N of storage cluster 310 have reached a threshold deviation, the threshold deviation may be reconfigured. For example, the user (e.g., the administrator of storage cluster 310) may reconfigure the threshold deviation when IHS 110A-110N of storage cluster 310 have reached the threshold deviation. For instance, the threshold deviation may be reconfigured, after IHSs 110A-110N of storage cluster 310 have reached the threshold deviation, to continue wear leveling of IHSS 110A-110N of storage cluster 310. As an example, the threshold deviation may be configured with a first threshold deviation, and after IHSs 110A-110N of storage cluster 310 have reached the threshold deviation, the threshold deviation may be configured with a second threshold deviation. For instance, the first threshold deviation may be 10%, and the second threshold deviation may be 20%. In one or more embodiments, one or more of vendor server 340, management console 342, and cluster manager 346 may be implemented via one or more IHSs 110. For example, one or more of vendor server 340, management console 342, and cluster manager 346 may be implemented via one or more IHSs 110 of storage cluster 310.

Figure 4:
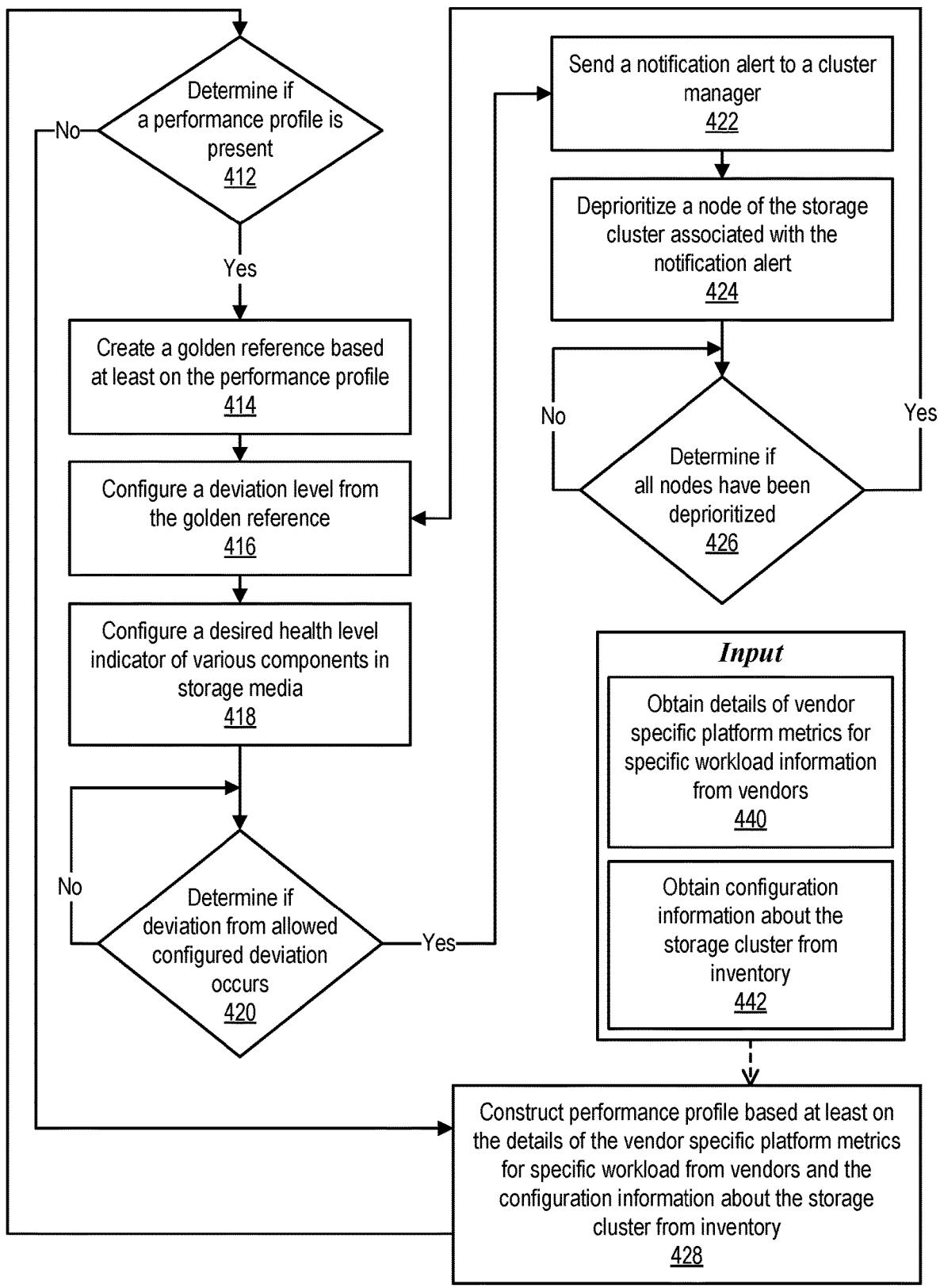
FIG. 4 illustrates an example of a method of operating a storage cluster, according to one or more embodiments.

Turning now to FIG. 4, an example of a method of operating a storage cluster is illustrated, according to one or more embodiments. At 412, it may be determined if a performance profile is present. For example, management console 342 may be determined if a performance profile is present. For instance, determining if a performance profile is present may include determining if DB 344 stores a performance profile. If the performance profile is not present, the performance profile may be created based at least on details of vendor specific platform metrics for specific workload from vendors and configuration information about the storage cluster from inventory, at 428. For example, management console 342 may create the performance profile based at least on details of vendor specific platform metrics for specific workload information from vendors and configuration information about the storage cluster from inventory information. In one instance, details of vendor specific platform metrics for specific workload information from vendors may be obtained, at 440. As an example, management console 342 may obtain details of vendor specific platform metrics for specific workload information from vendors via vendor server 340. In another instance, configuration information about the storage cluster from inventory may be obtained, at 442. As an example, management console 342 may obtain configuration information about the storage cluster from inventory information via DB 344. In one or more embodiments, the method may proceed to 412.

If the performance profile is present, a golden reference may be created with base at least on the performance profile, at 414. For example, management console 342 may create a golden reference with based at least on the performance profile. At 416, a deviation level from the golden reference may be configured. For example, management console 342 may configure a deviation level from the golden reference. For instance, management console 342 may receive user input from an administer of storage cluster 310 to configure a deviation level from the golden reference.

At 418, a desired health level indicator of various components in storage media. For example, management console 342 may configure a desired health level indicator of various components in storage media 330A-330C. In one or more embodiments, a health level associated with storage media 330 may be indicated via alerts. For example, the health level associated with storage media 330 may be indicated a lack of or a low number of alerts associated with storage media 330. In one or more embodiments, when storage media 330 includes a SSD, a health level associated with storage media 330 may be based at least on a number of writes to the SSD. For example, the health level associated with storage media 330 may be a numerical value associated with a number of writes to the SSD. For instance, the numerical value associated with the number of writes to the SSD may be based at least on a total number of writes to the SSD that the SSD may handle without data loss as specified by a vendor of the SSD.

In one or more embodiments, configuring the desired health level indicator of various the components in the storage media may include configuring one or more threshold values associated with the components in the storage media. In one example, a first threshold value associated with storage media 330A may be configured. For instance, the first threshold value associated with storage media 330A may be a first numerical value. In a second example, a second threshold value associated with storage media 330B may be configured. For instance, the second threshold value associated with storage media 330B may be a second numerical value. In another example, a third threshold value associated with storage media 330C may be configured. For instance, the third threshold value associated with storage media 330C may be a third numerical value.

At 420, it may be determined if deviation from allowed configured deviation occurs. For example, management console 342 may determine if deviation from allowed configured deviation occurs. If deviation from allowed configured deviation does not occur, the method may proceed to 420, according to one or more embodiments. If deviation from allowed configured deviation occurs, a notification alert may be sent to a cluster manager, at 422. For example, management console 342 may send a notification alert to cluster manager 346.

At 424, a node (e.g., an information handling system) of the storage cluster associated with the notification alert may be deprioritized. For example, cluster manager 346 may deprioritize a node (e.g., an IHS 110 of IHSs 110A-110N) of storage cluster 310 associated with the notification alert. In one or more embodiments, deprioritizing a node may mean that the node is prioritized such that the node is not made available for one or more portions of one or more new workloads. In one or more embodiments, deprioritizing the node of the storage cluster associated with the notification alert may include reducing a workload of the node. In one example, the workload of the node may be reduced from 100% to 90%. In another example, the workload of the node may be reduced from 88% to 73%.

At 426, it may be determine if all nodes have been deprioritized. For example, management console 342 may determine if all nodes have been deprioritized. In one or more embodiments, if all nodes have met or exceeded the deviation level from the golden reference, all the nodes may be deprioritized. If all nodes have not been deprioritized, the method may proceed to 426, according to one or more embodiments. If all nodes have been deprioritized, the method may proceed to 416, according to one or more embodiments. For example, a new deviation level from the golden reference may be configured at 416.

Figure 5A:
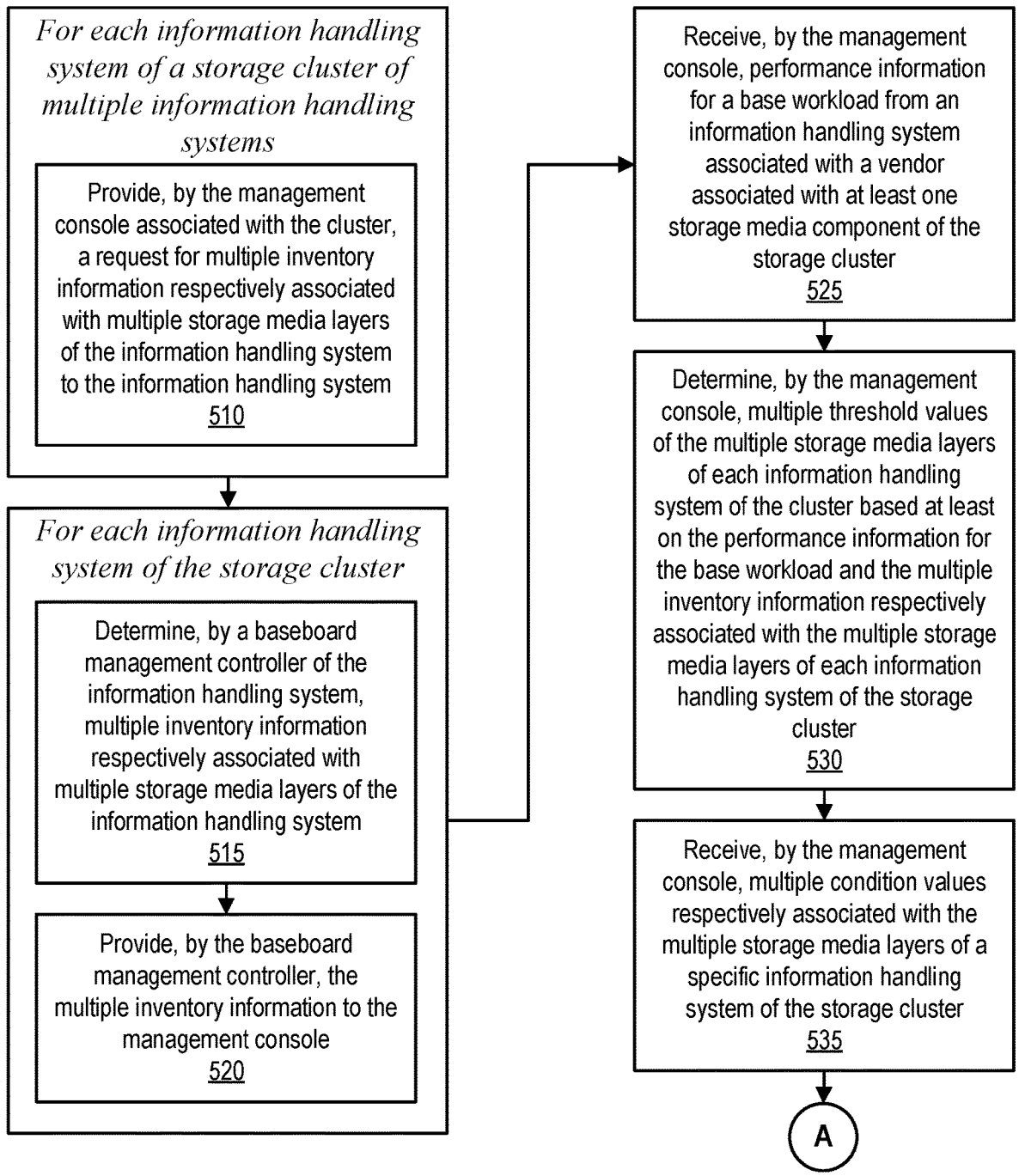
FIGS. 5A and 5B illustrate another example of a method of operating a storage cluster, according to one or more embodiments.
Figure 5B:
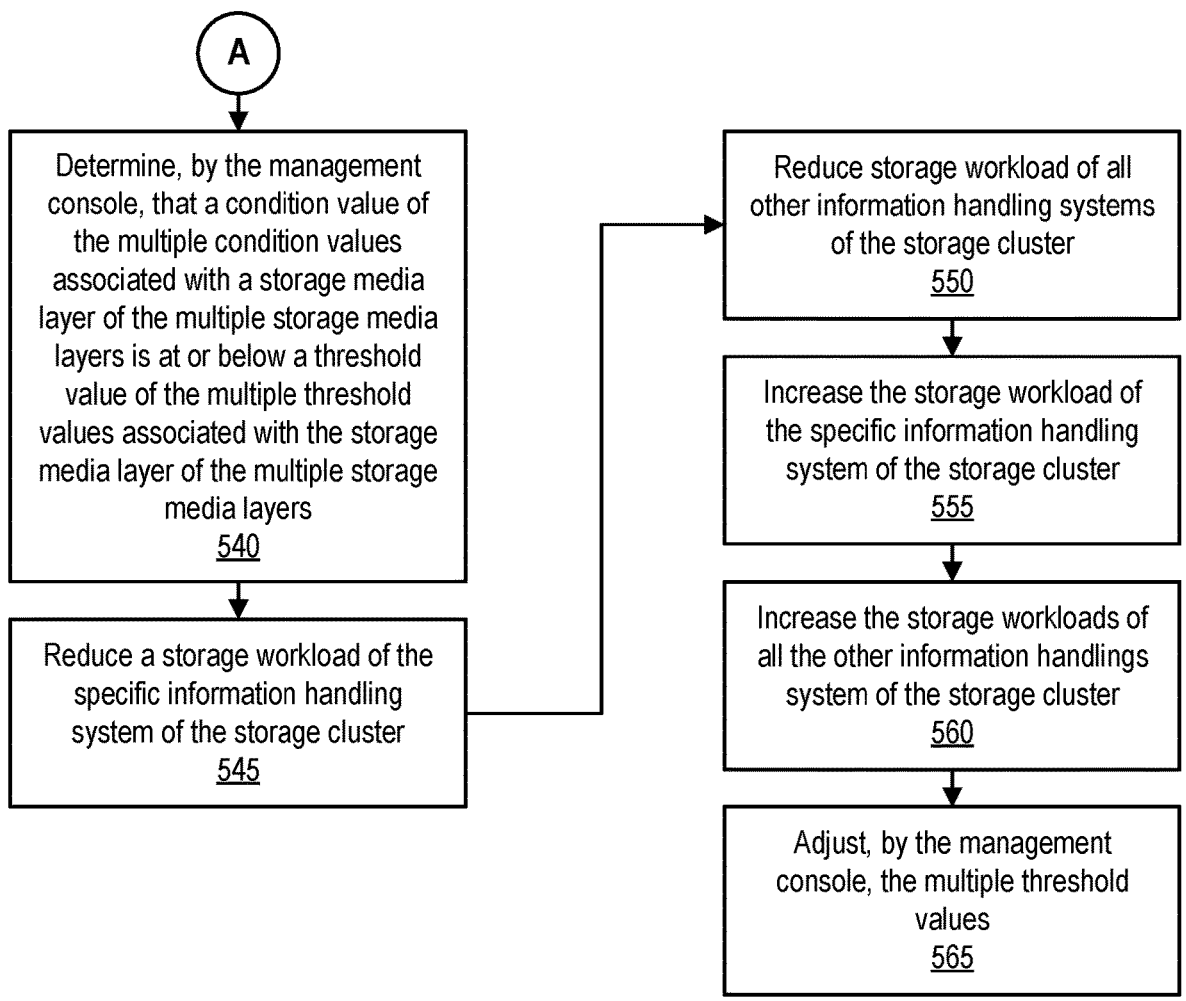

Turning now to FIGS. 5A and 5B, another example of a method of operating a storage cluster is illustrated, according to one or more embodiments. For each information handling system of a storage cluster of multiple information handling systems, a request for multiple inventory information respectively associated with multiple storage media layers of the information handling system to the information handling system may be provided by a management console associated with the cluster, at 510. For each information handling system of the storage cluster: a baseboard management controller of the information handling system may determine multiple inventory information respectively associated with multiple storage media layers of the information handling system, at 515, and may provide the multiple inventory information to the management console, at 520.

At 525, the management console may receive performance information for a base workload from an information handling system associated with a vendor associated with at least one storage media component of the storage cluster. At 530, the management console may determine multiple threshold values of the multiple storage media layers of each information handling system of the storage cluster based at least on the performance information for the base workload and the multiple inventory information respectively associated with the multiple storage media layers of each information handling system of the storage cluster.

At 535, the management console may receive multiple condition values respectively associated with the multiple storage media layers of a specific information handling system of the storage cluster (e.g., an IHS 110 of IHSs 110A-110N of storage cluster 310). At 540, the management console may determine that a condition value of the multiple condition values associated with a storage media layer of the multiple storage media layers is at or below a threshold value of the multiple threshold values associated with the storage media layer of the multiple storage media layers.

At 545, a storage workload of the specific information handling system of the storage cluster may be reduced. In one example, cluster manager 346 may reduce a storage workload of the specific information handling system of the storage cluster. In another example, management console 342 may reduce a storage workload of the specific information handling system of the storage cluster. For instance, management console 342 may cause a storage workload of the specific information handling system of the storage cluster to be reduced.

In one or more embodiments, reducing the storage workload of the specific information handling system of the storage cluster may include reducing a storage I/O data rate associated with the specific information handling system of the storage cluster. In one or more embodiments, reducing a storage workload of the specific information handling system of the storage cluster may be performed in response to determining that the condition value associated with the storage media is at or below the threshold value associated with the storage media layer. In one or more embodiments, the storage workload of the specific information handling system of the storage cluster may be reduced to reduce wear of one or more of the storage media layers of the specific information handling system of the storage cluster. For example, reducing the storage workload of the specific information handling system of the storage cluster may be performed in implementing a wear leveling process among the information handling systems of the storage cluster.

At 550, storage workloads of all other information handling systems of the storage cluster may be reduced. In one example, cluster manager 346 may reduce storage workloads of all other information handling systems of the storage cluster. In another example, management console 342 may reduce storage workloads of all other information handling systems of the cluster. For instance, management console 342 may cause storage workloads of all other information handling systems of the storage cluster to be reduced.

At 555, the storage workload of the specific information handling system of the storage cluster may be increased. In one example, cluster manager 346 may increase the storage workload of the information handling system of the storage cluster. In another example, management console 342 may increase the storage workload of the specific information handling system of the storage cluster. For instance, management console 342 may cause the storage workload of the specific information handling system of the storage cluster to be increased.

In one or more embodiments, reducing the storage workload of the specific information handling system of the storage cluster may include reducing the storage workload of the specific information handling system of the storage cluster from a first storage I/O data rate to a second storage I/O data rate, less than the first storage I/O data rate. For example, increasing the storage workload of the specific information handling system of the storage cluster may include increasing the storage workload of the specific information handling system of the storage cluster to the first storage I/O data rate.

At 560, storage workloads of all other information handling systems of the storage cluster may be increased. In one example, cluster manager 346 may increase storage workloads of all other information handling systems of the cluster. In another example, management console 342 may increase storage workloads of all other information handling systems of the cluster. For instance, management console 342 may cause storage workloads of all other information handling systems of the cluster to be increased.

At 565, the management console may adjust the multiple threshold values. In one or more embodiments, adjusting the multiple threshold values may include reducing the multiple threshold values. For example, the information handling systems of the storage cluster may have been worn to a first wear level, and the multiple threshold values may be reduced to wear the information handling systems of the storage cluster to a second wear level. In one or more embodiments, the method may proceed to 535.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
    a storage cluster of a plurality of information handling systems;
    a management console; and
    a cluster manager;
    wherein the plurality of information handling systems include a respective plurality of baseboard management controllers;
    wherein, for each baseboard management controller of the plurality of baseboard management controllers, the baseboard management controller is configured to:
        determine a plurality of inventory information respectively associated with a plurality of storage media layers of the information handling system; and
        provide the plurality of inventory information to the management console;
    wherein the management console is configured to:
        receive performance information for a base workload from an information handling system associated with a vendor information handling system associated with at least one storage media component of the storage cluster;

determine a plurality of threshold values of the plurality of storage media layers of each information handling system of the cluster based at least on the performance information for the base workload and the plurality of inventory information respectively associated with the plurality of storage media layers of each information handling system of the storage cluster;

receive a plurality of condition values respectively associated with the plurality of storage media layers of a specific information handling system of the storage cluster; and determine that a condition value of the plurality of condition values associated with a storage media layer of the plurality of storage media layers is at or below a threshold value of the plurality of threshold values associated with the storage media layer of the plurality of storage media layers; and wherein the cluster manager is configured to:
in response to determining that the condition value associated with the storage media is at or below the threshold value associated with the storage media layer, reduce a storage workload of the specific information handling system of the storage cluster.

2. The system of claim 1, wherein, to reduce the storage workload of the specific information handling system of the storage cluster, the cluster manager is further configured to reduce a storage I/O data rate associated with the specific information handling system of the storage cluster.

3. The system of claim 1, wherein the cluster manager is further configured to:
after reducing the storage workload of the specific information handling system of the storage cluster, reduce storage workloads of all other information handling systems of the storage cluster; and
after reducing storage workloads of all other information handling systems of the storage cluster, increase the storage workload of the specific information handling system of the storage cluster.

4. The system of claim 3,
wherein, to reduce the storage workload of the specific information handling system of the storage cluster, the cluster manager is further configured to reduce the storage workload of the specific information handling system of the storage cluster from a first storage I/O data rate to a second storage I/O data rate; and
wherein, to increase the storage workload of the specific information handling system of the storage cluster, the cluster manager is further configured to increase the storage workload of the specific information handling system of the storage cluster to the first storage I/O data rate.

5. The system of claim 1, wherein, for each information handling system of the storage cluster, the management console is further configured to provide a request for the plurality of inventory information respectively associated with the plurality of storage media layers of the information handling system to the information handling system.

6. The system of claim 1,
wherein a first storage media layer of the plurality of storage media layers is associated with a first I/O data rate;
wherein a second storage media layer of the plurality of storage media layers is associated with a second I/O data rate;

wherein a third storage media layer of the plurality of storage media layers is associated with a third I/O data rate;
wherein the first I/O data rate is greater than or equal to the second I/O data rate; and
wherein the second I/O data rate is greater than or equal to the third I/O data rate.

7. The system of claim 6,
wherein the first storage media layer includes volatile memory media; and
wherein the second storage media layer includes non-volatile memory media.

8. The system of claim 7,
wherein the volatile memory media include random access memory; and
wherein the non-volatile memory media include at least one solid state drive.

9. The system of claim 8, wherein the third storage media layer includes at least one magnetic media hard drive.

10. The system of claim 1, wherein the information handling systems of the cluster are coupled to a network.

11. A method, comprising:
for each information handling system of a storage cluster of information handling systems:
determining, by a baseboard management controller of the information handling system, a plurality of inventory information respectively associated with a plurality of storage media layers of the information handling system; and
providing, by the baseboard management controller, the plurality of inventory information to a management console associated with the storage cluster;
receiving, by the management console, performance information for a base workload from an information handling system associated with a vendor information handling system associated with at least one storage media component of the storage cluster;
determining, by the management console, a plurality of threshold values of the plurality of storage media layers of each information handling system of the cluster based at least on the performance information for the base workload and the plurality of inventory information respectively associated with the plurality of storage media layers of each information handling system of the storage cluster;
receiving, by the management console, a plurality of condition values respectively associated with the plurality of storage media layers of a specific information handling system of the storage cluster;
determining, by the management console, that a condition value of the plurality of condition values associated with a storage media layer of the plurality of storage media layers is at or below a threshold value of the plurality of threshold values associated with the storage media layer of the plurality of storage media layers; and
in response to the determining that the condition value associated with the storage media is at or below the threshold value associated with the storage media layer, reducing a storage workload of the specific information handling system of the storage cluster.

12. The method of claim 11, wherein the reducing the storage workload of the specific information handling system of the storage cluster includes reducing a storage I/O data rate associated with the information handling system of the storage cluster.

13. The method of claim 11, further comprising:
after the reducing the storage workload of the specific information handling system of the storage cluster, reducing storage workloads of all other information handling systems of the storage cluster; and
after the reducing storage workloads of all other information handling systems of the storage cluster, increasing the storage workload of the specific information handling system of the storage cluster.

14. The method of claim 13,
wherein the reducing the storage workload of the specific information handling system of the storage cluster includes reducing the storage workload of the specific information handling system of the storage cluster from a first storage I/O data rate to a second storage I/O data rate; and
wherein the increasing the storage workload of the specific information handling system of the storage cluster includes increasing the storage workload of the specific information handling system of the storage cluster to the first storage I/O data rate.

15. The method of claim 11, further comprising:
for each information handling system of the storage cluster:
providing, by the management console, a request for the plurality of inventory information respectively associated with the plurality of storage media layers of the information handling system to the information handling system.

16. The method of claim 11,
wherein a first storage media layer of the plurality of storage media layers is associated with a first I/O data rate;
wherein a second storage media layer of the plurality of storage media layers is associated with a second I/O data rate;
wherein a third storage media layer of the plurality of storage media layers is associated with a third I/O data rate;
wherein the first I/O data rate is greater than or equal to the second I/O data rate; and
wherein the second I/O data rate is greater than or equal to the third I/O data rate.

17. The method of claim 16,
wherein the first storage media layer includes volatile memory media; and
wherein the second storage media layer includes non-volatile memory media.

18. The method of claim 17,
wherein the volatile memory media include random access memory; and
wherein the non-volatile memory media include at least one solid state drive.

19. The method of claim 18, wherein the third storage media layer includes at least one magnetic media hard drive.

20. The method of claim 11, wherein the information handling systems of the cluster are coupled to a network.

* * * * *